United States Patent [19]

Enami

[11] Patent Number: 4,805,592

[45] Date of Patent: Feb. 21, 1989

[54] JOINT CONSTRUCTION FOR METAL SHEETS

[75] Inventor: Toshiaki Enami, Nara, Japan

[73] Assignee: Enami Seiki Mfg. Co., Ltd., Yao, Japan

[21] Appl. No.: 17,063

[22] Filed: Feb. 20, 1987

[51] Int. Cl.⁴ .................... B21D 39/02; B23P 11/00
[52] U.S. Cl. .................... 126/273 R; 29/509; 29/521
[58] Field of Search ............. 29/509, 521; 126/273 R

[56] References Cited

U.S. PATENT DOCUMENTS 2,916,181 12/1959 Pfister et al. ........................ 29/521
3,286,314 11/1966 Oetiker ................................ 29/521
3,469,568 9/1969 Torrey et al. .................. 126/273 R
3,548,152 12/1970 Klepzig ......................... 126/273 R

FOREIGN PATENT DOCUMENTS 0033809 3/1980 Japan .................................. 29/521
0190737 11/1982 Japan .................................. 29/521
0536955 6/1941 United Kingdom ................. 29/521

Primary Examiner—P. W. Echols
Assistant Examiner—Taylor J. Ross
Attorney, Agent, or Firm—W. G. Fasse; D. H. Kane, Jr.

[57] ABSTRACT

A joint construction for metal sheets is made by joining first and second metal sheets with the aid of a plastic working deformation. The first metal sheet is provided with first cut-up pieces to have openings therein. A portion of one end edge of the second metal sheet partly superposed on the first metal sheet is held between the openings and the first cut-up pieces and in this state it is pressed with the cut-up pieces so that the portion is pressed into the openings. The portion of the second metal sheet pressed into the openings is locked by the peripheral walls of the openings and by the cut-up piece pressing against the portion.

5 Claims, 11 Drawing Sheets

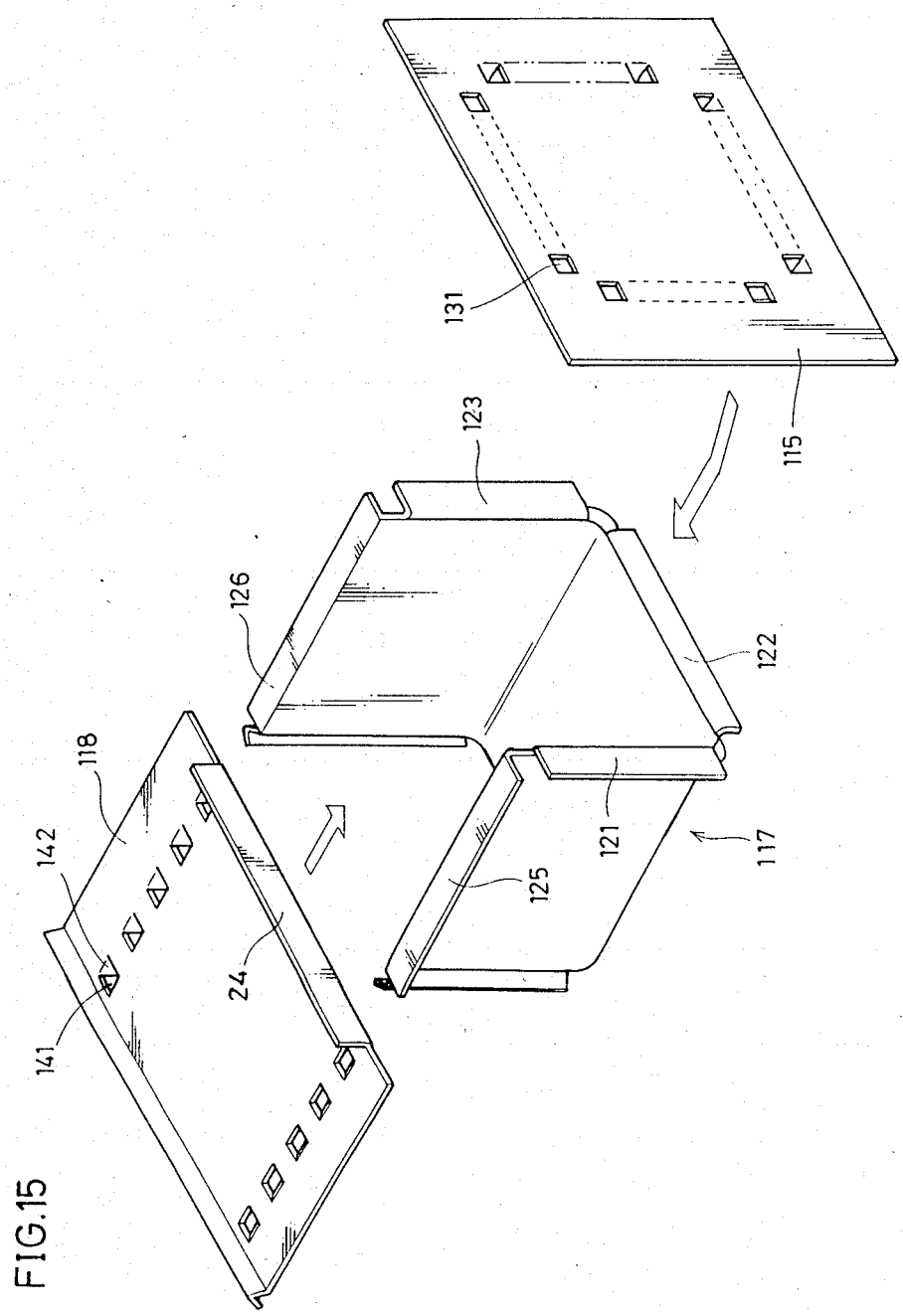

4,805,592

JOINT CONSTRUCTION FOR METAL SHEETS

BACKGROUND OF THE INVENTION

1. Field of the Invention

This invention relates to a joint construction for metal sheets which is made by utilizing a plastic working deformation of the metal sheet.

2. Description of the Prior Art

Various joint constructions have been proposed heretofore for joining metal sheets together, including welding, riveting, crimping, or curling techniques.

For parts which are to be exposed on the outside of an article, however, it is desirable to dispense with a coating operation by using coated steel sheets. In that case, it is not desirable to employ a joint construction based on welding, because it would be necessary to coat the joined portions again after welding.

On the other hand, in a joint construction using rivets, the use of rivets in addition to metal sheets to be joined is required, involving performing a sequence of troublesome operations for forming the joint construction, such as drilling holes for receiving rivets, inserting rivets in the drilled holes, and up-setting the rivets. Moreover, special equipment must be used.

Also, in a joint construction utilizing plastic deformation as in a crimping or curling operation, a subsequent coating operation can be avoided by using coated steel sheets. However, a special mold and equipment are required for forming the joint.

SUMMARY OF THE INVENTION

Accordingly, it is an object of the invention to provide a joint construction for metal sheets, whereby metal sheets to be joined can be easily and reliably joined without requiring special equipment.

In a joint construction for metal sheets, a first metal sheet is formed with cut-up pieces to have openings therein. A second metal sheet is superposed on the first metal sheet in such a manner that a portion of the edge of the second metal sheet is held between the openings and the cut-up pieces in the first metal sheet, and in this state it is pressed along with the cut-up pieces to press the portion into the openings. Thus, the portions of the second metal sheet pressed into the openings are locked by the inner peripheral walls of the openings.

In this invention, in forming a joint, it is only necessary to form cut-up pieces on the first metal sheet to have openings therein, without having to subject the second metal sheet to any preparatory processing operation. Thus, a rugged joint construction can be obtained by simply pressing a portion of the second metal sheets into the openings in the first metal sheet by using a simple press device.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a perspective view for explaining the steps for assembling the inner box for a cooking appliance shown in FIG. 14;

DESCRIPTION OF THE PREFERRED EMBODIMENTS AND OF THE BEST MODE OF THE INVENTION

Figure 1:
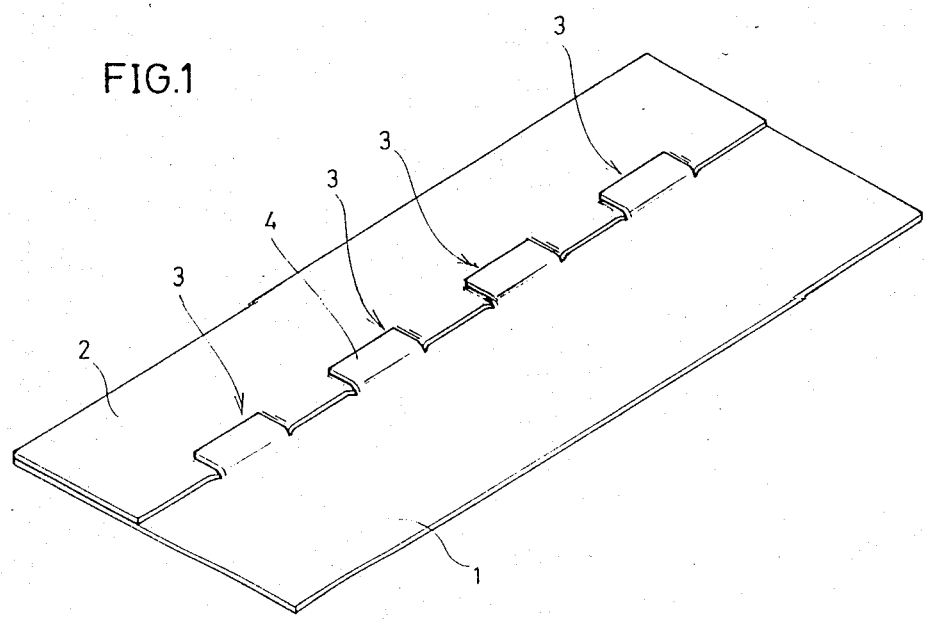
FIG. 1 is an external perspective view showing a joint construction according to a first embodiment of the invention.

FIG. 1 is a perspective view showing the external appearance of the joint construction according to a first embodiment of the invention. In this embodiment, a plurality of joint locations 3 are formed when a first metal sheet 1 and a second metal sheet 2 are joined together. As is clear from FIG. 1, at the joint locations 3, the cut-up pieces also referred to as tongues 4 formed on the first metal sheet 1 extend toward the second metal sheet 2, and the portion of the second metal sheet 2 which is in contact with the cut-up pieces or tongues 4 is depressed; thus, the construction is such that the second metal sheet 2 is, as it were, interlaced with the first metal sheet. The joint construction of this embodiment will now be described with reference to FIGS. 2 to 8.

Figure 2:
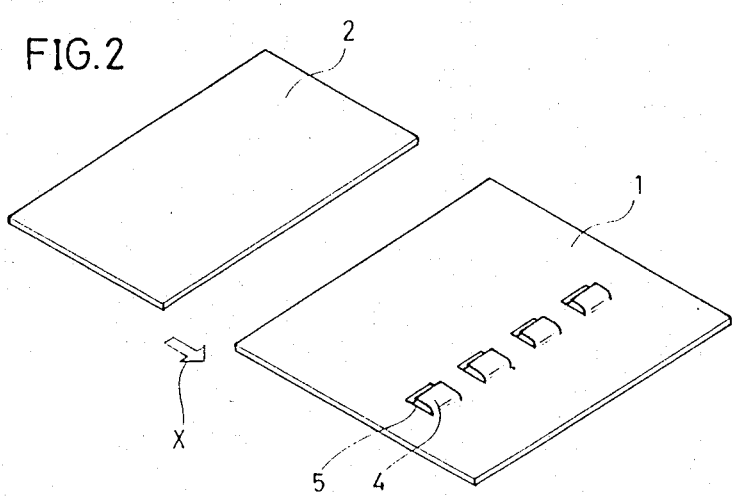
FIG. 2 is a perspective view showing a first metal sheet and a second metal sheet which are used to obtain the joint construction shown in FIG. 1.
Figure 3:
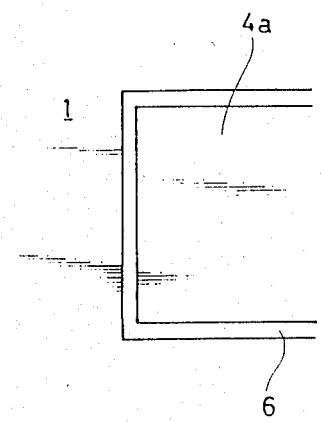
FIG. 3 is a fragmentary plan view for explaining a slit for forming a first cut-up piece.

In forming the joint construction shown in FIG. 1, the first and second metal sheets 1 and 2 are prepared as shown in FIG. 2. The second metal sheet 2 has no preparatory processing operation applied thereto. On the other hand, the first metal sheet 1 is formed with cut-up pieces or tongues 4 to have openings therein. In addition, the state which exists before the cut-up piece or tongues 4 is raised, is shown in FIG. 3 which is a fragmentary plan view. As is clear from FIG. 3, the portion 4a which forms the tongues 4 is smaller than an opening 5. That is, in forming the cut-up piece or tongues 4 and the opening 5, the amount of metal sheet corresponding to slit or slot 6 is removed.

Figure 4:
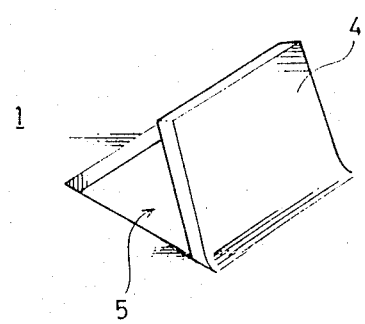
FIG. 4 is a perspective view for explaining an example of the shape of the first cut-up piece.

The portion 4a which forms the cut-up piece or tongues shown in FIG. 3 is further raised so that it lies above the opening 5, as shown in FIG. 4. Then, the second metal sheet 2 is placed on the openings 5 in the first metal sheet 1. A press operation is then performed to depress the cut-up pieces 4 so that the portion of the second metal sheet 2 opposed to the openings 5 is pressed into the openings 5. In this manner, the construction shown in FIG. 1 can be obtained.

Figure 4A:
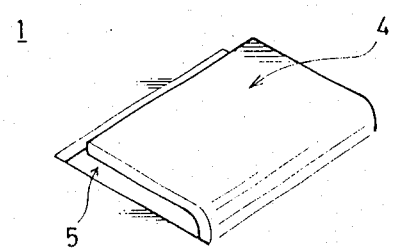
FIG. 4A is a perspective view showing another example of the shape of the first cut-up piece.
Figure 5:
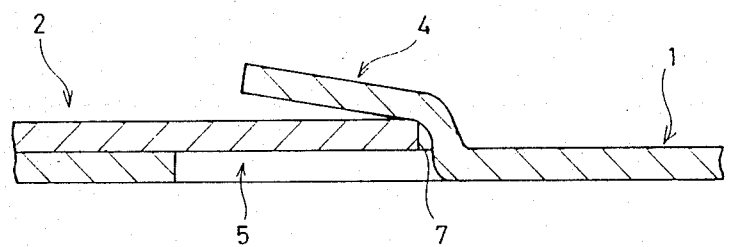
FIG. 5 is a sectional view showing the second metal sheet held between the first cut-up pieces and the first openings in the first metal sheet.

In addition, as shown in FIG. 4A, the tongues 4 may be bent from the first metal sheet so that it is disposed over and opposed to the opening 5 with a predetermined distance maintained therebetween. In that case, the distance between the lower surface of the tongues 4 and the upper end of the opening 5. i.e., the upper surface of the first metal sheet 1 is greater than the thickness of the second metal sheet 2. The reason is that the second metal sheet 2 must be inserted between the tongues pieces 4 and the openings 5, as will be later described. Subsequently, the second metal sheet 2 is moved in the direction of arrow X in FIG. 2 until the end 7 of the second metal sheet 2 is placed between the lower surfaces of the tongues 4 and the openings 5. This state is shown in FIG. 5 which is a sectional view. Then, in the state shown in FIG. 5, a press operation is performed to depress the tongues 4, whereby the portion of the second metal sheet 2 opposed to the openings 5, i.e., the end 7 is pressed into the openings 5. The joint construction shown in FIG. 1 can also be obtained in this manner.

The second metal sheet 2 can also be inserted by moving sheet 1 under sheet 2 in FIG. 5.

Figure 6:
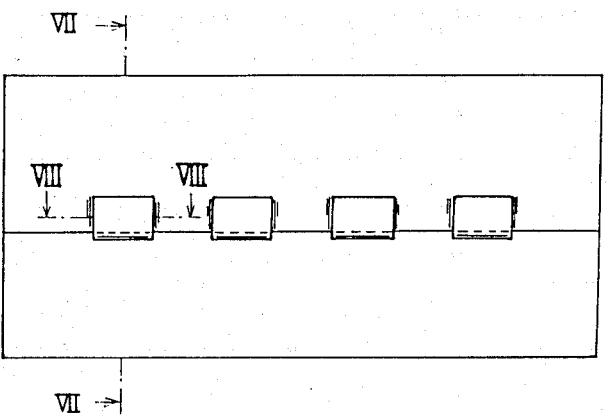
FIG. 6 is a plan view of the joint construction shown in FIG. 1.
Figure 7:
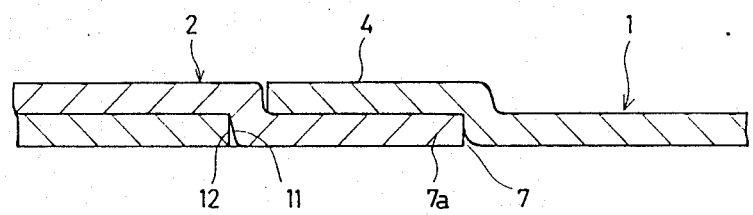
FIG. 7 is a sectional view taken along the line VII—VII in FIG. 6.
Figure 8:
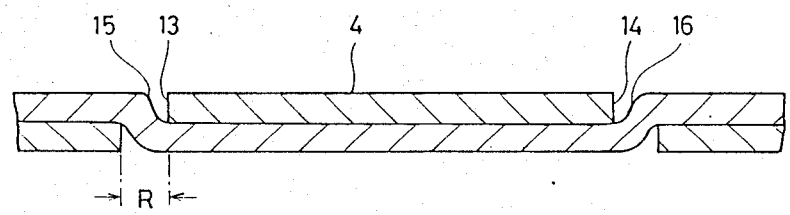
FIG. 8 is a sectional view taken along the line VIII—VIII in FIG. 6.

After making the joint, the construction obtained is as shown in FIGS. 6 to 8. That is, as is clear from the sectional view taken along the line VII—VII in FIG. 6, since the first and second metal sheets 1 and 2 are the same in thickness in this embodiment, the upper surfaces of the tongues 4 lie substantially flush with the upper surface of the second metal sheet 2. Further, the lower surface of the portion 7a which are pressed into the openings in the first metal sheet by the tongues 4 lies substantially flush with the lower surface of the first metal sheet 1.

In the joined state described above, the rear end 11 of the portion 7a of the second metal sheet 2 pressed into the openings 5 is locked by the front ends 12 of the peripheral edges of the openings 5. Thus, in the state shown in FIG. 7, even if the first and second metal sheets 1 and 2 are subjected to an external force which urges them to move away from each other, the locking between the rear edge 11 of each pressed-in portion 7a and the front edge 12 of the inner peripheral wall of each opening firmly joins the two metal sheets 1 and 2 together, making it difficult for the applied force to separate them.

Concerning the words "front" and "rear" as used in the "front edge" and "rear edge" of the pressed-in portion 7a, it is to be pointed out that the sides of the first and second metal sheets which are close to the mating sheet metal are termed front and those sides which are remote from the mating metal sheet are termed rear.

Examining the joint construction from a different angle of view reveals that, as shown in FIG. 8, the widthwise opposite ends of the portion 7a of the second metal sheet 2 pressed into the openings 5 are locked by portions of the peripheral wall of each opening 5, i.e., the lateral walls 15 and 16. Thus, even if the first and second metal sheets 1 and 2 are subjected to an external force in a direction which is substantially at right angles to the aforesaid front-rear direction, there is no danger of them being separated from each other. Thus, it is seen that a firm joint has been attained.

Figure 9:
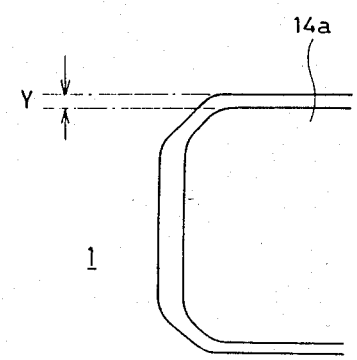
FIG. 9 is a plan view, corresponding to FIG. 3, for explaining another example of a slit for forming the first cut-up pieces.

Preferably, if the distance R shown in FIG. 8 is reduced, dislocation can be prevented more reliably. Thus, it is preferable, as shown in the plan view of FIG. 9 to form a metal piece 14a which will become the cut-up piece, so that the width Y of the slit is narrower than the thickness of the second metal sheet.

In the embodiment described with reference to FIGS. 1 to 9, a joint construction has been shown which is designed so that the second metal sheet is joined at one end edge thereof. However, the second metal sheet 22 may have a similar joint construction at the other end edge. If a first tongue 14A is formed on the first metal sheet at the end thereof associated with the other end edge of the second metal sheet 22, the second metal sheet 22 can be inserted in a direction which is substantially at right angles to the direction of extension of the first tongues 24 and 24A, whereupon a press operation is performed to join the opposite end edges of the second metal sheet 22 to the first metal sheet 21 by the joint construction of the invention.

Figure 10:
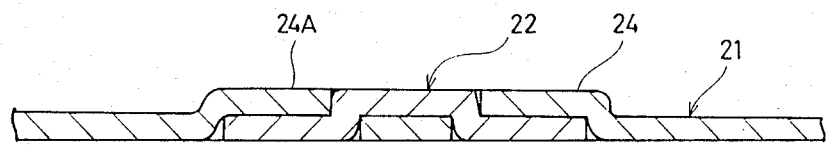
FIG. 10 is a sectional view for explaining a joint construction according to a second embodiment of the invention.

In the embodiment shown in FIG. 10, separate metal sheets may be joined to the opposite end edges of the second metal sheet 22. That is, by means of the joint construction of the invention, the second metal sheet 22 may be joined at one end edge thereof to the first metal sheet and at the other end edge thereof to a third metal sheet (not shown).

Figure 11:
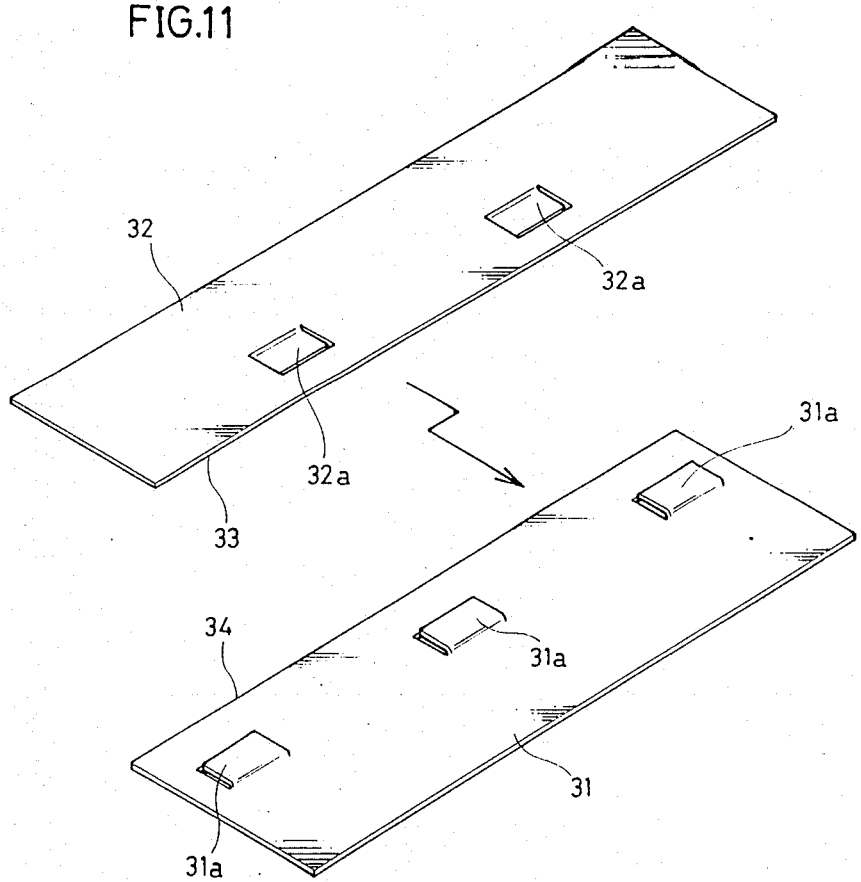
FIG. 11 is a perspective view of a first metal sheet and a second metal sheet which are used to obtain a joint construction according to a third embodiment of the invention.
Figure 12:
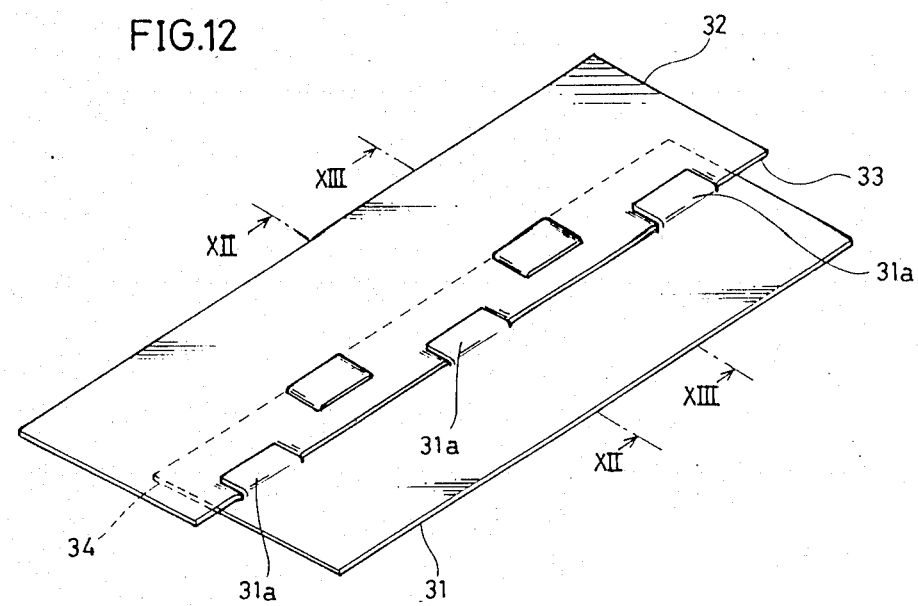
FIG. 12 is a perspective view showing a joint construction formed by using the first and second metal sheets shown in FIG. 11.
Figure 13:
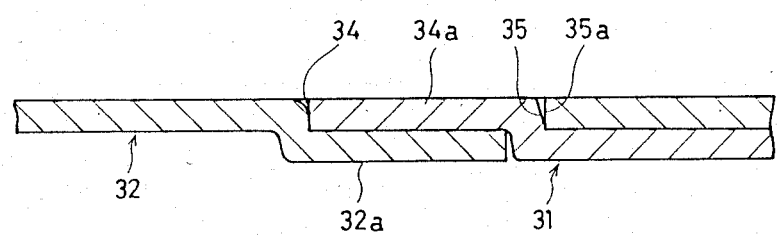
FIG. 13 is a sectional view taken along the line XIII—XIII in FIG. 12.

FIGS. 11 to 13 are views for explaining a third embodiment of the invention. In the joint construction of the third embodiment, a first metal sheet 31 and a second metal sheet 32 shown in FIG. 11 are used. The first metal sheet 31 is formed with first tongues 31a to have first openings therein, said tongues being spaced a predetermined distance in the direction of the length of the first metal sheet 31.

The second metal sheet 32 is also formed with second tongues 32a to have second openings therein, said cut-up pieces being parallel to the end edge 33 of the second metal sheet 32 and being spaced a predetermined distance from each other. However, the second tongues 32a are directed downwardly of the second metal sheet 32.

In joining the first and second metal sheets 31 and 32, the second metal sheet 32 is partly superposed on the first metal sheet 31 so that the end edge 33 of the second sheet 32 is held between the first tongues 31a and the main surface of the first metal sheet 31. In this case, on the second metal sheet 32, the end edge 34 of the first sheet 31 is held between the second tongues 32a and the back of the second metal sheet 32. Thus, a joint construction shown in the perspective view of FIG. 12 is formed by a press operation in this assembled state.

In the construction shown in FIG. 12, the joint portion shown the section view taken along the line XII—XII, i.e., the joint portion formed of the first tongues 31a and the first opening in the first metal sheet 31 and of the second metal sheet 32 is the same as the joint portion shown in FIG. 7. Thus, the above description of FIG. 7 also applies to the joit construction formed of the first tongues 31 and the respective first opening.

The joint portion shown in a sectional view taken along the line XIII—XIII in FIG. 12, is shown in FIG. 13. As is clear from FIG. 13, there is shown a joint construction which is the reverse of the one formed on the side associated with the first tongues 31a. More particularly, the portion 34a of the first metal sheet 31 adjacent its end edge 34 enters the second openings 35 formed in the second metal sheet 32 and is pressed with the second tongues 32a so that it is locked by the peripheral walls 35a of the second openings 35.

That is, in the joint construction shown in FIG. 12, two different joint structures are combined, namely, the joint construction of FIG. 7 and a similar joint construction formed by utilizing the second tongues 32a, second openings 35 formed in the second metal sheet 32, and the portion of the first metal sheet 31 adjacent its end edge 31. Thus, even if the joint construction is subjected to an external force which tends to move the first and second metal sheets 31 and 32 away from each other, there is much less danger of them being dislocated.

An application of the joint construction for metal sheets according to the invention, to an inner box for a cooking appliance will now be described with reference to FIGS. 14 to 22.

Figure 14:
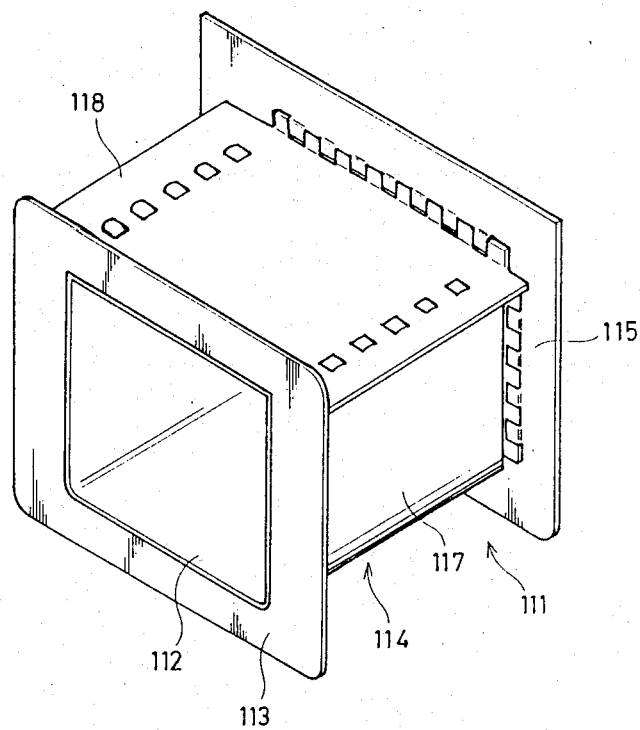
FIG. 14 is a perspective view showing an inner box for a cooking appliance constructed by using the joint construction shown in FIG. 1.

FIG. 14 is a perspective view showing an inner box for a cooking appliance. The inner box 111 comprises a front sheet 113 having an opening 112, a sleeve-like barrel 114, and a rear sheet 115. The sleeve-like barrel 114 is constructed by joining a barrel sheet 117 in the form of a U-shaped metal sheet to a top sheet 118.

The inner box 111 in this embodiment is characterized by a joint construction between the barrel sheet 117 and the top sheet 118, a joint construction between the top sheet 118 and the rear plate 115, and a joint construction between the barrel 117 and the rear plate 115. The joining between the front sheet 113 and the sleeve-like barrel 114 may be performed by any known coupling operation.

The manufacturing process of the inner box 111 will now be described. As shown in FIG. 15, the barrel sheet 117 bent into U form is prepared. The barrel sheet 117 is joined to the top sheet 118 to form the sleeve-like barrel 114 (see FIG. 14). The rear end edge of the barrel sheet 117 is provided with flanges 121 to 123. Similarly, the rear end edge of the top sheet 118 has flange 124. Further, the portion of the upper edge of the barrel sheet 117 to be joined to the top sheet 118 has a second flanges 125 and 126.

Figure 16:
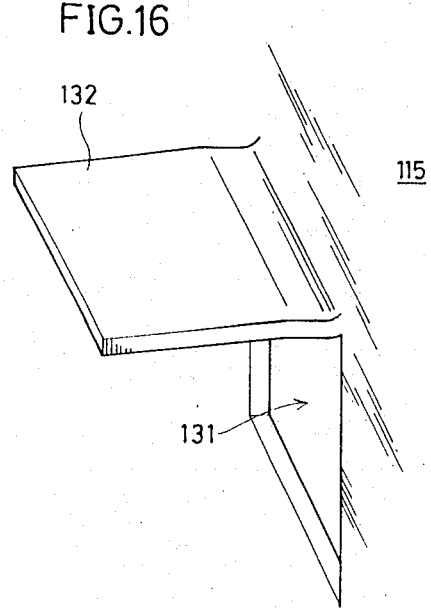
FIG. 16 is an enlarged perspective view for explaining the first cut-up piece in the inner box for a cooking appliance of FIG. 14.

The rear sheet 115 to be joined to the barrel sheet 117 and top sheet 118 has a plurality of through-holes 131 arranged in the area corresponding to the periphery of the rear opening in the sleeve-like barrel 114. Each through-hole 131, as shown in FIG. 16, is the result of forming a cut-up piece 132 which is smaller than the through-hole 131. Stated differently, the cutting up operation removes a peripheral portion of the tongues 32. Therefore, in FIG. 15, at the through-holes 131, all the tongues 132 are extended forward. However, the cut-up pieces 132 are formed so that they extend forward from the outer peripheries of the through-holes 131 in order to make a joint to be described below. Thus, it is seen that the tongues 132 shown in FIG. 16 have been formed on the upper side of the rear sheet 115 shown in FIG. 15. The front portion of each tongues 132 is bent so that it is directed backward to the through-hole 131. This is for the purpose of facilitating the formation to be described below.

Referring back to FIG. 15, the top sheet 118 also has a plurality of through-holes 141 as a result of forming the tongues 142. In this case also, the cut-up pieces 142 have been formed along the outer peripheral side of the top sheet 118. Though not clearly shown in FIG. 15, the front edge of each tongues 142 is directed somewhat backward to the through-hole 141, as in the case of the tongues 132.

In the inner box of the embodiment, joints are made between the top sheet 118 and the barrel sheet 117, between the top sheet 118 and the rear sheet 115, between the barrel sheet 117 and the rear sheet 115, and between the barrel sheet 117 and the rear sheet 115 by utilizing the tongues 131, 141 and flanges 121 to 123 and 125 and 126. Since these joint constructions are the same, only the joint between the top sheet 118 and the rear sheet 115 will be described.

Figure 18:
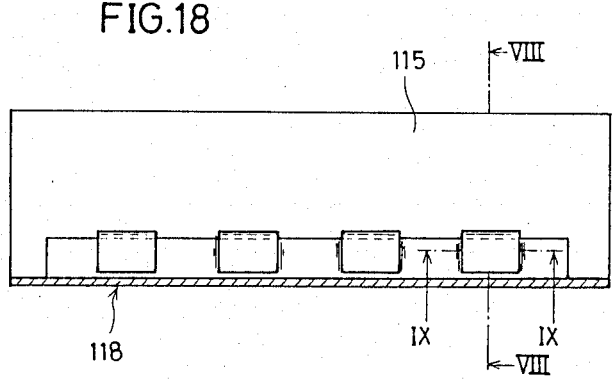
FIG. 18 is a front view showing the joint construction used in the inner box for a cooking appliance in FIG. 14.
Figure 17:
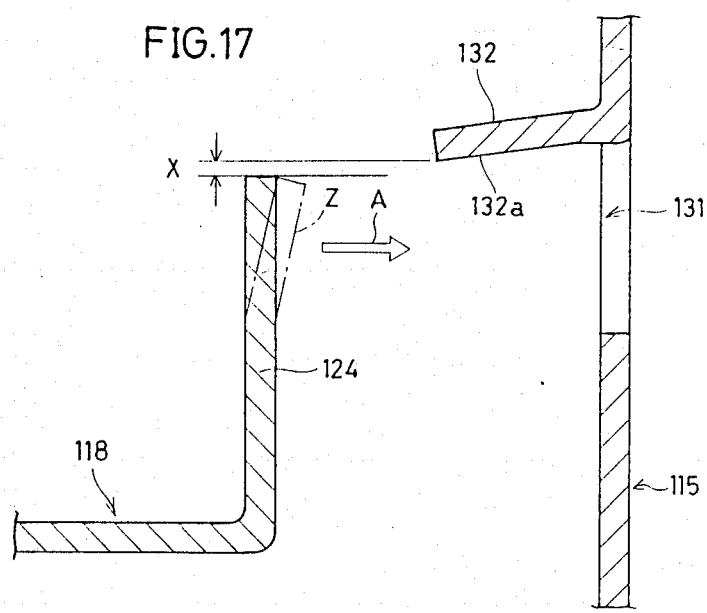
FIG. 17 is an enlarged sectional view for explaining the joint construction in the example shown in FIG. 14.
Figure 19:
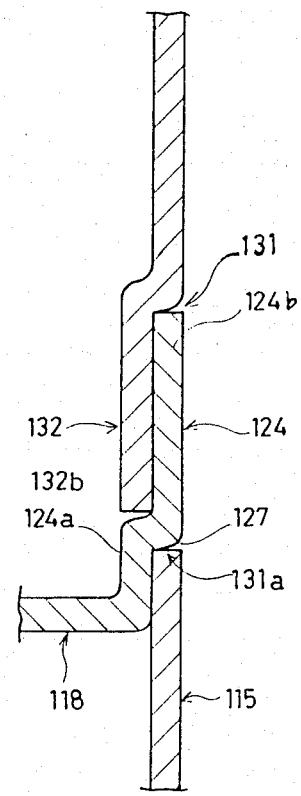
FIG. 19 is a sectional view taken along the line XIX—XIX in FIG. 18.
Figure 20:
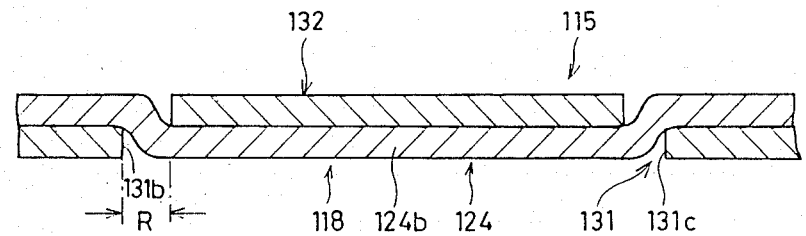
FIG. 20 is a sectional view taken along the line XX—XX in FIG. 18.
Figure 21:
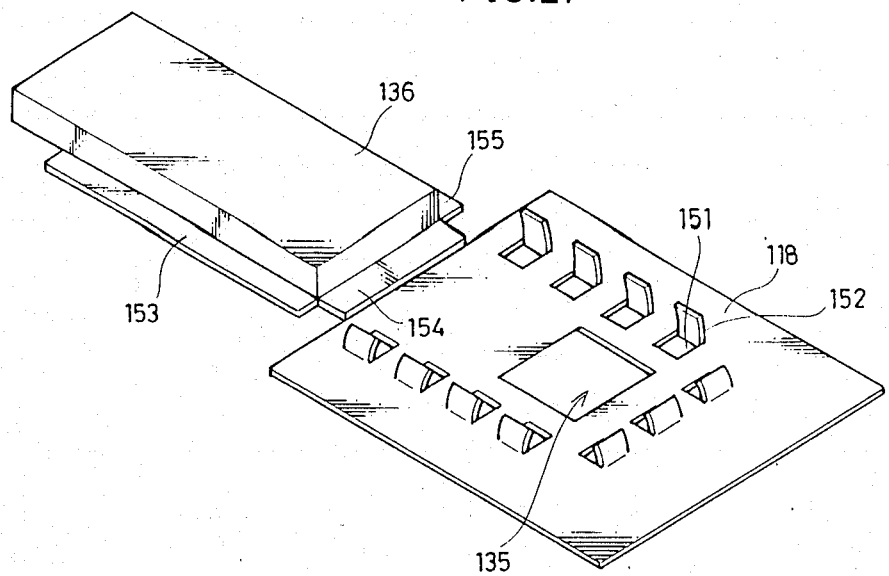
FIGS. 21 and 22 are perspective views for explaining the steps for joining a wave guide to a top panel.

Referring to FIG. 17, the flange 24 of the top sheet 118 is moved in the direction of arrow A until it is placed on the through-hole 131 in the rear sheet 115. In this case, in order that the flange 124 may be moved to be opposed to the through-hole 131, it is so positioned that there is defined a distance X between the front edge of the front portion 132a of the tongues 132 and the front edge of the flange 124. In addition, as is clear from FIG. 17, the front portion 132a of the cut-up piece 132 is bent downwardly toward the through-hole 131. The connecting end of the front portion 132a has a length corresponding to the thickness of the flange 124 as described above. Therefore, by performing a press operation using a mold with the flange 124 placed on the rear sheet 115, the joint construction shown in FIGS. 18 to 20 is obtained. As shown in FIG. 19, the front surface 132B of the cut-up piece 132 is substantially flush with the front surface 124a of the flange 124. Therefore, the front end portion 124b of the flange is pressed into the through-hole 131.

In addition, preferably, if the front end of the flange 124 is bent as shown in phantom lines in FIG. 17, the parts to be joined can be put together more easily. This means that the assembling operation using an automatic machine can be facilitated.

In the joint construction shown in FIGS. 18 to 20, the base end 127 of the pressed-in portion 124b of the flange 124 is locked by the lower end 131a of the through-hole 131. Thus, in the state shown in FIG. 19, even if an external force is applied which tends to move the top sheet 118 and the rear sheet 115 away from each other, it is seen that there is little danger of separating the sheets from each other, since the top sheet 118 and the rear sheet 115 are firmly joined by the locking engagement between the base end 127 of the pressed in portion 124b an the lower end 131a of the peripheral wall of the through-hole.

Examining the joint construction from a different angle of view reveals that as shown in FIG. 20, the widthwise opposite edges of the pressed-in flange 124 are locked by portions of the peripheral wall of the through-hole 131, i.e., the lateral walls 131b and 131c. Thus, even if a separating external force is applied to the inner box, there is no danger of dislocation.

Preferably, if the distance R in FIG. 20 is reduced, dislocation can be prevented more reliably. Therefore, it is seen that it is preferable that half the difference between the widths of the tongues 132 and the through-hole 131 be less than the thickness of the top sheet 118.

The joint between the top sheet 118 and the rear sheet 115 of the inner box 111 shown in FIG. 14 has been made in the manner described above. The joint between the top sheet 118 and the barrel sheet 115 and the joint between the barrel sheet 117 and the rear sheet 115 have been made in the same manner.

In the inner box 111 of this embodiment, coated steel sheets are used as the components to facilitate the joining operation and particularly to dispense with a coating operation. On the other hand, in the inner box 111 for a cooking appliance, it is required that the components be electrically interconnected. Therefore, the use of coated steel sheets offers the problem of how to ensure electrical contact. In the inner box 111 of this embodiment, however, as shown in FIG. 20, the flange 124 is scratched by the end edge of the cut-up piece 132. The end edge is exposed by the cut-up operation and hence has no coating thereon. This is true also of the other joint portions.

As described above, in the inner box 111 of this embodiment, the top sheet 118, the barrel sheet 117 and the rear sheet 115 can be easily joined by a pressing operation without having to apply any complicated preparatory processing operation thereto, i.e., by simply forming the barrel sheet with flanges 121 to 126 and the top sheet 118 and rear sheet 115 with cut-up pieces 131 and 141, as shown in FIG. 15.

Figure 22:
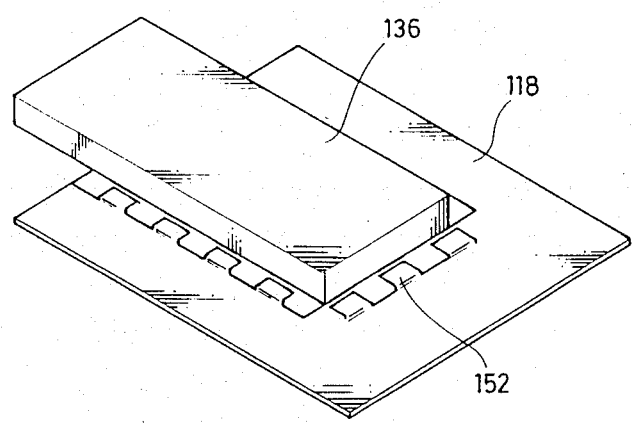

The inner box 111 of a microwave oven is often provided with a wave guide attached to the barrel sheet or top sheet; such a wave guide can also be joined thereto by utilizing the joint construction described above. An example of this will now be described with reference to FIGS. 21 and 22 wherein the top sheet 118, the middle portion of which is shown has an opening 135. A box-shaped metal member 135 adapted to form a wave guide is joined to the top sheet 118 in such a manner that it covers, the opening 135. The top sheet 118 has cut-up pieces 152 with openings therein, while the peripheral edge of the metal member 136 has flanges 153 to 155. The joint the same manner as in the joint between the top sheet 118 and the rear sheet 115 described above, the whereby the metal member 136 is joined to the top sheet 118, as shown in FIG. 22. Thus, it is seen that not only the body of the inner box 111 shown in FIG. 14 but also the metal member to be attached to the periphery thereof can be easily joined by utilizing the characteristic joint construction of this embodiment.

In the above embodiment, the sleeve-like barrel 114 has been constructed of the barrel sheet 117 and top sheet 118. However, it is that such sleeve-like barrel 114 may be formed of a metal member which has been shaped as a sleeve in prior step.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for making a sheet metal joint between an edge of a first piece of sheet metal and a second piece of sheet metal, comprising the following steps:
   (a) leaving said edge of said first piece of sheet metal as a flat edge initially undisturbed and without any holes,
   (b) punching a plurality of generally U-shaped slots into said second sheet metal piece for forming a tongue surrounded by its respective U-shaped slot,
   (c) bending said tongue out of said second sheet metal piece sufficiently for forming a gap between said tongue and said second sheet metal piece,
   (d) pushing said initially undisturbed holeless flat edge of said first sheet metal piece into said gap, and
   (e) pressing said tongue against said first sheet metal piece for plastically deforming a portion of said first sheet metal piece into said U-shaped slot surrounding said tongue, whereby said plastically deformed portion of said first sheet metal piece anchors said first sheet metal piece to said second sheet metal piece and whereby said pressed tongue maintains the anchoring.

2. The method of claim 1, wherein said punching step and said bending step are merged into one continuous step.

3. A sheet metal joint between two pieces of sheet metal, comprising a plurality of plastically deformed depressions along at least one edge of a first piece of sheet metal, a respective plurality of apertures in a second piece of sheet metal, said one edge overlapping said second piece of sheet metal so that said plastically deformed depressions are fitting into said apertures, tongues in said second piece of sheet metal cut out to form said apertures with a slot between said tongues and a respective aperture edge, said tongues being pressed against said one edge of said first piece of sheet metal to form said depressions into which said tongues fit to firmly hold said depressions in said apertures, said sheet metal joint further comprising additional apertures and tongues in said first piece of sheet metal along an edge of said first piece of sheet metal, further depressions along an edge of said second piece of sheet metal, said further apertures and tongues and said further depressions being staggered relative to said first mentioned apertures, tongues and depressions, said edges overlapping so that two rows of joints are formed along said overlapping edges of said first and second pieces of sheet metal.

4. The sheet metal joint of claim 3, wherein said one edge of said first piece of sheet metal is a bent-over flange.

5. A sheet metal box, especially for a cooking appliance, comprising a first sheet metal wall component (117) having at least one main wall section and end edges bent over to form flange portions (122), at least one second sheet metal wall component for attachment to said first sheet metal component, and sheet metal joint means between said first sheet metal wall component and said second sheet metal wall component, said sheet metal joint means comprising a plurality of plastically deformed depressions in said flange portions, a respective plurality of apertures in said second sheet metal wall component, said flange portions overlapping said second sheet metal wall component so that said plastically deformed depressions are fitting into said apertures, tongues in said second sheet metal wall component cut out to form said apertures with a slot between said tongues and a respective aperture edge, said tongues being pressed against said flange portions of said first sheet metal wall component to form said depressions into which said tongues fit to firmly hold said depressions in said apertures, wherein said first sheet metal wall component has three wall sections forming approximately a U-sectional configuration with an open top, said open top also having further bent-over flange portions with further plastically deformed depressions in said further flange portions, said box comprising a third wall component for closing said open top, a further plurality of apertures in said third wall component, said further bent-over flange portions overlapping said third sheet metal wall component so that said further plastically deformed depressions are fitting into said further apertures in said third wall component, further tongues in said third wall component cut out to form said further apertures with a slot between said further tongues and a respective aperture edge, said further tongues being pressed against said further flange portions to form said further depressions into which said further tongues fit to firmly hold said further depressions in said further apertures and thus said first, second, and third sheet metal wall components to each other.

* * * * *